United States Patent [19]

Hashimoto

[11] Patent Number: 4,837,803

[45] Date of Patent: Jun. 6, 1989

[54] TELEPHONE ANSWERING DEVICE HAVING FUNCTION OF PLAYBACK WITHOUT REWINDING TAPE

[75] Inventor: Kazuo Hashimoto, Tokyo, Japan

[73] Assignee: Hashimoto Corporation, Tokyo, Japan

[21] Appl. No.: 200,777

[22] Filed: Jun. 1, 1988

[30] Foreign Application Priority Data

Jun. 2, 1987 [JP] Japan .................. 62-138623

[51] Int. Cl.$^4$ ........................................... H04M 1/65
[52] U.S. Cl. ...................................... 379/79; 379/77; 379/75
[58] Field of Search ...................... 379/70, 73, 74, 77, 379/79, 75; 360/74.1, 74.4

[56] References Cited

U.S. PATENT DOCUMENTS

| | | | |
|---|---|---|---|
| 3,872,254 | 3/1975 | Murata et al. | 379/77 |
| 4,400,586 | 8/1983 | Hanscom | 379/77 |
| 4,654,485 | 3/1987 | Yamamoto | 379/77 |
| 4,672,659 | 6/1987 | Hanscom et al. | 379/79 |
| 4,710,950 | 12/1987 | Yamamoto | 379/70 |
| 4,713,835 | 12/1987 | Bond et al. | 379/70 |

FOREIGN PATENT DOCUMENTS 2077075  5/1981  United Kingdom .
2077554  6/1981  United Kingdom .

Primary Examiner—Alan Faber
Attorney, Agent, or Firm—Lowe, Price, LeBlanc, Becker & Shur

[57] ABSTRACT

A telephone answering device having immediate playback function, wherein incoming messages from calling parties are successively recorded after sending of an outgoing message, and the recorded incoming messages can be successively played back immediately from a beginning position of an incoming message tape without rewinding when a user operates the device manually or remotely to save time for the user.

1 Claim, 2 Drawing Sheets

TELEPHONE ANSWERING DEVICE HAVING FUNCTION OF PLAYBACK WITHOUT REWINDING TAPE

BACKGROUND OF THE INVENTION

The present invention relates to a telephone answering device capable of immediately playing back an incoming message from a calling party without rewinding an incoming message tape.

Conventional telephone answering devices use various recording medium mechanisms for recording the incoming message tape to a certain position in order to play back the message. Thus, it takes much time at the time of playback, in spite of high rewinding speed. Further, according to a driving circuit which is disclosed in JAPAN No. S43-18722 B1 invented by the same applicant, the incoming message is dubbed onto another tape and there is no need of rewinding at the time of playback of the message. However, said driving circuit has a very complicated arrangement and so it is not suitable to use for a home telephone answering device.

SUMMARY OF THE INVENTION

It is an object of the present invention to provide a telephone answering device with a most simple mechanism and having no complicated function such as dubbing, wherein the incoming message from the calling party is recorded after the sending of an outgoing message, and said recorded incoming message can be immediately played back without rewinding the incoming message tape when a user operates the device manually or remotely.

The above and other objects, features and advantages of the present invention will become more apparent from the following description when taken in conjunction with the accompanying drawings in which a preferred embodiment of the present invention is shown by way of illustrative example.

BEST MODE FOR PRACTICING THE INVENTION

A preferred embodiment of this invention is described in accordance with drawings as follows.

Figure 1:
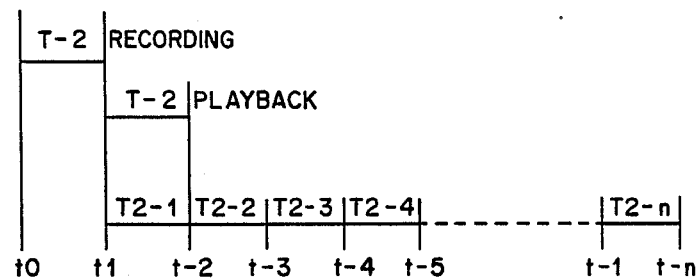
FIG. 1 is a timing chart for showing an operation of a tape in a conventional telephone answering device.

FIG. 1 shows a timing chart of Japanese Patent Publication No. 48-18722 which has been widely known. In the timing chart, there are an endless tape as a tape for an outgoing message and another endless tape for temporary recording, and a tape driving device for dubbing from the temporary recording endless tape for temporary recording to the dubbing tape for dubbing. When a telephone answering device receives a call, an outgoing message is played back from an outgoing message tape and is sent to the telephone line. A message on the temporary recording endless tape is dubbed to the dubbing tape. This operation is shown in the Japanese Publication No. 48-18722. However, in order to dub, play back, and hear the incoming message immediately, it is necessary to use a complicated tape driving device for dubbing messages.

Figure 2:
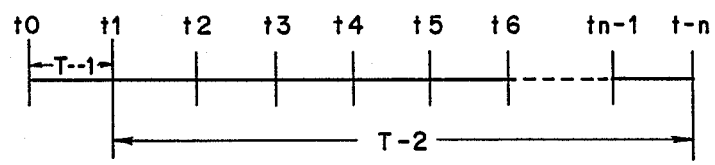
FIG. 2 is a timing chart for showing an operation of a tape in another conventional telephone answering device called a cassette style.

FIG. 2 shows a timing chart of a conventional driving device called a single cassette, wherein only one tape is used. A receiving section of the device cannot be driven while an answering section thereof is being driven, because the tape for an outgoing message and the tape for an incoming message are common. As a result, this device is inconvenient for handling in practice.

Figure 3:
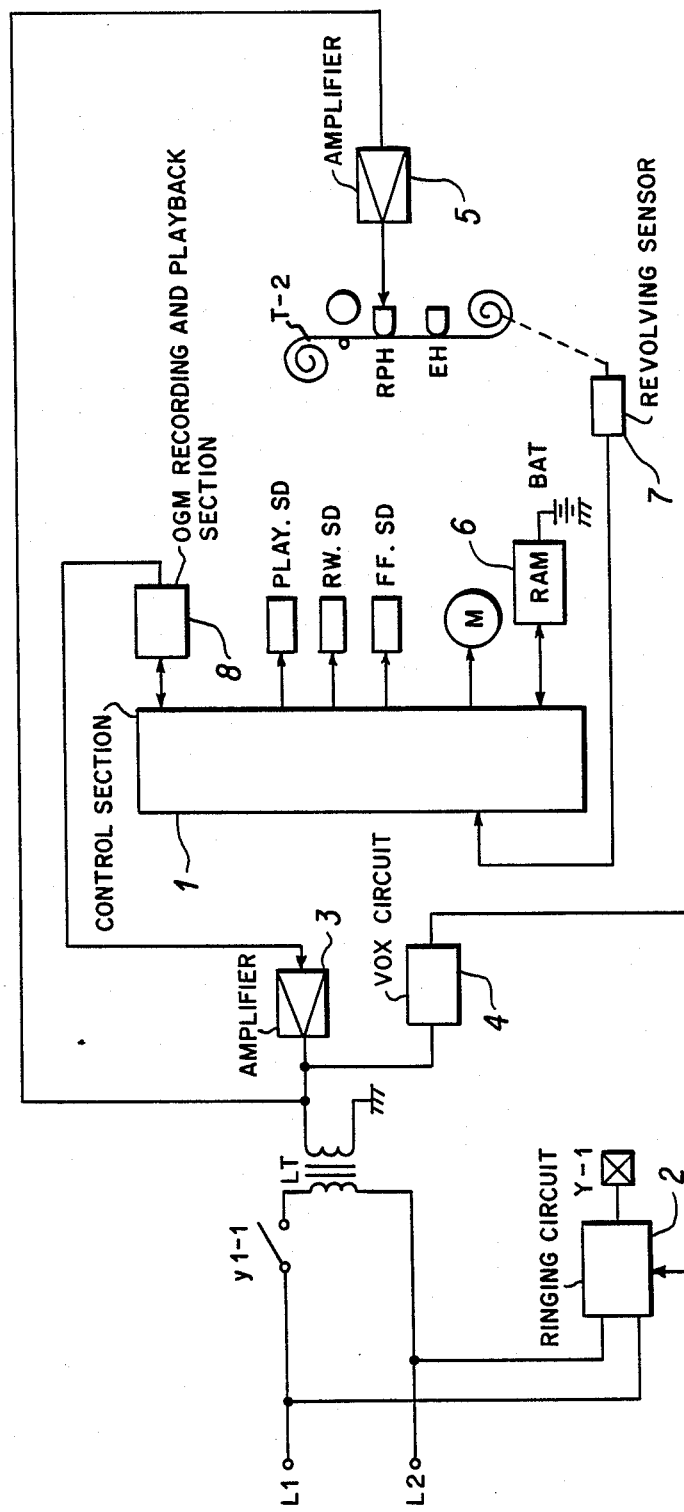
FIG. 3 is a block diagram showing the principle of a preferred embodiment of this invention.

FIG. 3 shows a block view of a preferred embodiment of this invention. L1 and L2 denote telephone lines. LT denotes a line transformer. 1 denotes a control section made of a microcomputer etc. 2 denotes a ringing circuit to detect a calling signal. Y-1 denotes a relay for closing. 8 denotes an OGM recording and playback section (T-1) for an outgoing message. 3 denotes an amplifier. 4 denotes a VOX circuit. 5 denotes an amplifier. 6 denotes a memory RAM (random access memory) for memorizing a tape position of a tape for an incoming message T-2. 7 denotes a revolving sensor for outputting a tape position as pulses. PLAY and SD denote a solenoid for sending the tape for an incoming message T-2 to the normal direction. RW and SD denote a solenoid for rewinding the tape for an incoming message T-2. FF and SD denote a solenoid for forwarding the tape for an incoming message T-2. M denotes a motor for driving.

When this device is set at a waiting condition, a motor M, and a solenoid for rewinding RW, SD are driven, and an incoming message tape is rewound to its beginning point, detected by a lack of pulses from the revolving sensor 7 which determines whether or not the incoming message tape is rewound.

When the telephone answering device receives a call at a waiting condition with the tape for an incoming message T-2 at the beginning point, the calling signal is detected by the ringing circuit 2, relay Y-1 is set to "ON" and the telephone line is set to the closing condition by a point of contact Y1-1.

An outgoing message is output from an OGM recording and playback section 8 and is sent to a caller through the amplifier 3. When sending of an outgoing message is finished, an input message from the first caller is recorded at the distance from t0-t1 as shown in the FIG. 2, because in the first receiving call, the incoming message tape is at the beginning point.

Relay Y-1 is restored by an output from the VOX circuit 4 through the ringing circuit 2, and a tape position t-1 of the incoming message tape is memorized in the memory RAM by memorizing a pulse from the revolving sensor 7 through the control section 1. After that, a solenoid RW and SD for rewinding are driven, and the incoming message tape is rewound to the beginning point. Then, the telephone answering device cannot receive a call from the outside during rewinding a tape.

Figure 4:
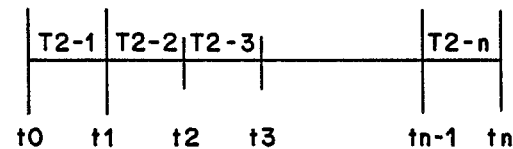
FIG. 4 is a timing chart of an incoming message tape of a preferred embodiment of this invention.

While the telephone answering device receives the next call from the outside and an outgoing message is sent, the incoming message tape is fast forwarded to the point t1. When sending of an outgoing message is finished, an incoming message from a caller is recorded at the distance from t1 to t2 as shown in FIG. 4. After that, the telephone answering device is restored and the incoming message tape is rewound continuously to the beginning point.

This operation is repeated, and a message of T2-1–T2-n is stored on tape for an incoming message T-2. Moreover, when this device is not operated, the incoming message tape is always set at the beginning point. As a result, when an owner switches to the play back condition by a manual operation after going back home, it is possible to play back a tape at once without rewinding it.

In the foregoing explanation, when this device is set to the waiting condition, the incoming message tape is rewound to the beginning point (called 0 mode). However, the tape position of an incoming message recorded last is recorded in the RAM 6, so that it is possible to record a new incoming message after the incoming message recorded in the RAM. (accumulate mode)

As above, as being compared with the conventional telephone answering devices which needed dubbing operation in order to play back a message on a tape for an incoming message at once, this cevice can play back a message on the incoming message tape without dubbing operation. This device is accordingly very effective.

In this disclosure, there is shown and described only the preferred embodiment of the invention, but, as aforementioned, it is to be understood that the invention is capable of use in various other combinations and environments and is capable of changes or modifications with in the scope of the inventive concept as expressed herein.

What is claimed:

1. A telephone answering device having immediate playback function, comprising;
   means for sending a prerecorded outgoing message to a calling party in response to an incoming call;
   means for setting an incoming message tape to a most suitable recording position during said sending of the outgoing message;
   means for recording an incoming message from the calling party on the incoming message tape from said most suitable recording position according to a beep tone generated after said sending of the outgoing message;
   means for rewinding the incoming message tape to a beginning position after the recording of said incoming message is completed;
   means for fast forwarding said incoming message tape to next recording position following said recording position while the outgoing message is sent out to the calling part in response to next incoming call;
   means for recording the incoming message from said next recording position on the incoming message tape according to the beep tone generated after the sending of the outgoing message; and
   means for rewinding again the incoming message tape to the beginning position after said recording,
   wherein when a user returns to his home or he remotely operates the device from a remote location after the incoming messages from the calling parties are successively recorded, said recorded incoming messages can be played back immediately from the beginning position of the incoming message tape.

* * * * *